United States Patent Office 3,714,340
Patented Jan. 30, 1973

3,714,340
PROCESS FOR THE PREPARATION OF
SODIUM DITHIONITE
Ryozo Fujiwara, Eiji Ohara, Kazuo Maeda, Fumio Terada, Toshiyuki Sugino, Hiroyasu Arakane, and Yoshimoto Watanabe, Omuta, Japan, assignors to Mitsui Toatsu Chemicals, Inc., Tokyo, Japan
No Drawing. Filed Nov. 3, 1970, Ser. No. 86,633
Claims priority, application Japan, Nov. 7, 1969, 44/88,778
Int. Cl. C01b 17/98
U.S. Cl. 423—515                                    4 Claims

ABSTRACT OF THE DISCLOSURE

A process for preparing sodium dithionite which comprises blowing sulfur dioxide at a temperature of 65–80° C. into an aqueous methanol solvent containing a mixture of sodium formate and an alkali selected from the group consisting of sodium hydroxide and sodium carbonate, the amount of alkali being 20–40 parts by weight, as sodium hydroxide, the amount of sulfur dioxide being 90–135 parts by weight, and the amount of solvent being 380–700 parts by weight, per 100 parts by weight of sodium formate.

---

This invention relates to improvements in the process for preparing sodium dithionite using sodium formate as the starting material and, in particular, to a process for preparing sodium dithionite of high purity in good yield by blowing sulfur dioxide at a temperature of 65–80° C. into an aqueous methanol containing a mixture of sodium formate and either sodium hydroxide or sodium carbonate.

The method of preparing sodium dithionite from sodium formate, sodium bisulfite and sulfur dioxide is known. For example, Germany Patent No. 343,791 suggests a method of obtaining sodium dithionite by blowing sulfur dioxide into a suspension of sodium bisulfite and sodium formate in aqueous ethanol, but this method lacks commercial value in that the expensive ethanol is used and that the sodium dithionite is of a purity on the order of 70–75% at best and obtained at only a low yield owing to the influence of the impurities contained in the starting sodium bisulfite.

Further, U.S. Patent 2,010,615 discloses a method which comprises suspending sodium formate and either sodium hydroxide or sodium carbonate in aqueous methanol, blowing in sulfur dioxide at below 30° C., and thereafter conducting the reaction by raising the temperature to 70–75° C. However, in this method the reaction starts up suddenly during the time the temperature is being raised to cause the sodium separation of crystals, with the consequence that the resulting sodium dithionite is obtained as exceedingly fine particles. Particles of this sort have a great specific surface area to render them susceptible to oxidation by air. Accordingly, they lack commercial value. Moreover, the yield is also low in this method.

On the other hand, Japanese patent publication No. 7003/1968 proposes the use of a solution consisting of methanol infused with sulfur dioxide on the basis of the inference that the cause of the poor purity and yield of the product in the prior art such as the foregoing German Patent No. 343,791, etc., was possibly due to the setting up of the decomposition of the sodium dithionite during the reaction as a result of blowing the sulfur dioxide directly in its gaseous state. However, the use of sulfur dioxide in this manner with the sulfur dioxide absorbed in methanol has the shortcoming that the operation becomes complicated such as to render it not suitable for commercial practice, trough it may be effective in presenting the decomposition of the product.

An object of the present invention is to improve on these short-comings of the prior techniques and to provide a process by which sodium dithionite of high purity can be prepared in good yield by a simple operation.

Other objects and advantages of the invention will become apparent from the following description.

It has been found that when, in order that freshly formed sodium bisulfite can be utilized in the reaction in situ, a compound which forms sodium bisulfite by reacting with sulfur dioxide, i.e., either sodium hydroxide or sodium carbonate, is present in aqueous methanol along with sodium formate, and sulfur dioxide in a controlled amount is blown thereinto, the sodium dithionite decomposed during the reaction is of such a small amount as to compare favorably with the method disclosed in the foregoing Japanese patent publication No. 7003/1968 which uses a solution consisting of sulfur dioxide dissolved in methanol, even though in the method of the present invention the sulfur dioxide is blown in at an elevated temperature of 65–80° C. It was also found that sodium dithionite of high purity and great stability as well as with a specific surface area which is small and with uniform particulate forms could be obtained in good yield by operating as hereinabove described and thus that the objects of the invention could be achieved.

Accordingly, the present invention is directed to a process for preparing in good yield sodium dithionite of high purity by a simple operation consisting of conducting the reaction by blowing sulfur dioxide at an elevated temperature of 65–80° C., into an aqueous methanol suspension of sodium formate and an alkali such as either sodium hydroxide or sodium carbonate. If in this invention the reaction system is maintained under superatmospheric pressure either during the whole period of the reaction or the reaction period subsequent to the completion of the blowing in of the sulfur dioxide, the purity and yield of the product can be further improved over that of the instance where the reaction system is maintained at normal pressure.

If, instead of utilizing the sodium bisulfite formed in situ as in the invention, a separately prepared sodium bisulfite is used, a product of low purity can only be obtained, the yield also being low. Whether this is due to the influence of the impurities contained in sodium bisulfite or is due to the presence of conditions during the step of forming sodium bisulfite from the aforesaid alkalis and sulfur dioxide which set up conditions favorable for the preparation of sodium dithionite is not clear, but it is hypothesized that the latter is the case.

On the other hand, in the case of the method of the aforesaid U.S. Patent 2,010,615 wherein the temperature at which the sulfur dioxide is blown in is a low temperature of less than 30° C. but subsequently the temperature is raised to 70–75° C., not only the crystallized particles become minute but also the yield is low. In contrast, in the case of the present invention, since the sulfur dioxide can be blown in directly, not only is the operation simplified but also with the equipment requirement being less it is commercially of great advantage.

In the case of the present invention, however, a restriction is imposed as to the amounts of the starting compounds used in that a certain range must be observed. For example, when sodium hydroxide is to be used as the alkali, the amounts used of the several starting compounds per 100 parts by weight of sodium formate are: 20–40 parts by weight of sodium hydroxide, 90–135 parts by weight of sulfur dioxide and 380–700 parts by weight of the solvent. The amounts of the several compounds used when sodium carbonate is to be used as the alkali can be calculated from the foregoing figures. The terminology "sulfur dioxide in a controlled amount," as hereinbefore indicated, denotes an amount of sulfur dioxide that is arrived at as a matter of course on the basis of the foregoing figures. The preferred amount in which sulfur dioxide is used increases or decreases in accordance with the amount of the alkali used. When sodium hydroxide is used in an amount of 20 parts by weight per 100 parts by weight of the sodium formate, sulfur dioxide is preferably used in an amount of 90–98 parts by weight. On the other hand, when the amount of sodium hydroxide used is 40 parts by weight per 100 parts by weight of the sodium formate, the preferred amount is 122–135 parts by weight.

The present invention is carried out in the following manner:

Aqueous methanol is used as the solvent and it is preferably used in a methanol concentration of 70–85% and particularly 75–82%, by weight. While either sodium hydroxide or sodium carbonate can be used as the alkali, sodium hydroxide is to be preferred from the standpoint of its lower cost. The blowing in of sulfur dioxide is carried out at 65–70° C. in the case of normal atmospheric pressure and at 70–80° C. in the case of superatmospheric pressure, the time being from 0.5 to 3 hours. After the blowing in of sulfur dioxide is completed, a temperature of 68–70° C. is maintained for about 4 hours in the case where the reaction is being conducted under normal pressure and at 75–85° C. for 2–3 hours in the case of superatmospheric pressure. While there is no particular upper limit as to the pressure when conducting the reaction under pressure, a pressure not exceeding 10 kg./cm.$^2$ gauge is convenient. As means of obtaining the pressure, that consisting of imposing a restraint on the liberation of the carbon dioxide which evolves as a result of the reaction is simplest, but the introduction of an inert gas such as nitrogen will also do. After completion of the warming period, the sodium dithionite formed is filtered in a stream of nitrogen, washed with absolute methanol, followed by vacuum drying at 70–80° C. in a nitrogen stream to obtain in good yield sodium dithionite of a purity of usually above 92%.

The following non-limitative examples are given for specifically illustrating the invention.

EXAMPLE 1

A 1000-ml. pressure pressurizable round bottom flask equipped with a stirrer, a thermometer, a counter-current condenser (also serving as a gas discharge outlet), an inlet for the gas to be used for purging the system and a gas blow-in line was charged with 108 grams of sodium formate, 51.6 grams of 45% aqueous caustic soda solution, 326.3 grams of methanol and 80.4 grams of water, followed by stirring the charge. While raising the temperature, the inside of the system was thoroughly purged with nitrogen, after which 103.4 grams of sulfur dioxide were blown in at 68–70° C. via the gas blow-in line at a constant rate of blow during a 3-hour period. After the blowing in of the sulfur dioxide was completed, the system was closed by closing the gas discharge outlet, and the temperature was raised to 82° C. during a 30-minute period, at which temperature the system was then held for 2 hours.

During the period the temperature was raised, the internal pressure also started to rise. When the internal pressure rose to 1.5 kg./cm.$^2$ gauge, the waste gas was purged via the counter-current condenser so as to maintain the pressure thereafter at 1.5 kg./cm.$^2$ gauge. After the 2-hour warming period was completed, the system was cooled to 70° C. and the internal pressure was returned to normal atmospheric pressure. The crystals of sodium dithionite which separate out were filtered in a stream of nitrogen, promptly washed in 200 grams of methanol, and thereafter placed in a vacuum dryer and vacuum dried at 10–15 mm. Hg for 2 hours at 75° C. in a stream of nitrogen.

As a result, 119.4 grams of sodium dithionite of 92.5% purity were obtained. The yield (corrected to pure basis) was 40% of the sodium formate used, and the yield based on the sulfur dioxide was 78.5%.

EXAMPLE 2

An apparatus identical to that used in Example 1 was charged with 77.6 grams of sodium formate, 66.7 grams 45% aqueous caustic soda solution, 425 grams of methanol and 61.3 grams of water, followed by stirring the charge. While raising the temperature, the inside of the system was thoroughly purged with nitrogen, after which 100 grams of sulfur dioxide were blown in at 68–70° C. from the gas blow-in line at a constant rate during a 2-hour period. After the blowing in of the sulfur dioxide was completed, the system was closed by closing the gas discharge outlet, and the temperature was raised to 28° C. during a 30 minute period, at which temperature the system was then held for 2 hours.

During the period the temperature was raised, the internal pressure also started to rise. When the internal pressure rose to 1.5 kg./cm.$^2$ gauge, the waste gas was purged via the counter-current condenser so as to maintain the pressure thereafter at 1.5 kg./cm.$^2$ gauge.

Subsequently, by operating as in Example 1, 108.7 grams of sodium dithionite of 92.0% purity were obtained. The yield (corrected to pure basis) was 50.4% of the sodium formate used, and the yield based on the sulfur dioxide was 73.6%.

EXAMPLE 3

An apparatus identical to that used in Example 1 was charged with 108 grams of sodium formate, 51.6 grams of 45% aqueous caustic soda solution, 335 grams of methanol and 71.6 grams of water, after which the charge was stirred. While raising the temperature, the inside of the system was thoroughly purged with nitrogen, following which the internal pressure was built up to 0.5 kg./cm.$^2$ gauge with nitrogen and 103.4 grams of sulfur dioxide were blown in at 75–78° C. at a constant rate from the gas blow-in line during a period of 1.5 hours. During the period the sulfur dioxide was being blown in, the waste gas was purged via the counter-current condenser so as to maintain the internal pressure at 0.5 kg./cm.$^2$ gauge. After completion of the blowing in operation, the system was closed by closing the gas discharge outlet, after which the temperature was raised to 82° C., during a 30-minute period, at which temperature the system was held for 2 hours.

During the period the temperature was being raised, the internal pressure started to rise. When the internal pressure rose to 1.5 kg./cm.$^2$ gauge, the waste gas was purged via the counter-current condenser so as to maintain the pressure thereafter at 1.5 kg./cm.$^2$ gauge.

Thereafter the reaction was operated as in Example 1, whereupon sodium dithionite of 92.3% purity in an amount of 119.2 grams was obtained. The yield (corrected to pure basis) was 39.8% of the sodium formate used, and the yield based as the sulfur dioxide was 78.2%.

EXAMPLE 4

An apparatus identical to that used in Example 1 was charged with 90 grams of sodium formate, 51.6 grams of 45% aqueous caustic soda solution, 401.3 grams of methanol and 105.3 grams of water, after which the charge was stirred. While raising the temperature, the system was thoroughly purged with nitrogen, following which 98.2 grams of sulfur dioxide were blown in at 68–70° C. at a constant rate from the blow-in line during a 2-hour period.

After the blowing-in of the sulfur dioxide was completed, the system was held at the foregoing temperature for 4 hours under normal pressure following which the subsequent treatments were carried out as in Example 1 whereupon 95.5 grams of sodium dithionite of 91.0% purity were obtained. The yield (corrected to pure basis) was 37.7% of the sodium formate used, and the yield based on the sulfur dioxide was 65.1%.

We claim:

1. A process for preparing sodium dithionite which comprises blowing sulfur dioxide at a temperature of 65–80° C. into an aqueous methanol solvent containing a mixture of sodium formate and an alkali selected from the group consisting of sodium hydroxide and sodium carbonate, the amount of said alkali being 20–40 parts by weight, as sodium hydroxide, the amount of said sulfur dioxide blown in being 90–135 parts by weight and the amount of said solvent being 380–700 parts by weight, per 100 parts by weight of said sodium formate, the content of methanol in said solvent being 70–85% by weight.

2. The process of claim 1 wherein the reaction is carried out under a pressure of not greater than 10 kilograms per square centimeter gauge.

3. The process of claim 1 wherein the blowing in of sulfur dioxide is carried out at a temperature of 65–70° C. when the reaction is carried out at normal atmospheric pressure.

4. The process of claim 1 wherein the blowing in of sulfur dioxide is carried out at a temperature of 70–80° C. when the reaction is carried out at superatmospheric pressure.

References Cited

UNITED STATES PATENTS

| 2,010,615 | 8/1935 | Vanderbilt et al. | 23—116 |
| 3,411,875 | 11/1968 | Yoshikawa et al. | 23—116 |
| 3,576,598 | 4/1971 | Plentovich et al. | 23—116 |

FOREIGN PATENTS

| 1,148,248 | 4/1969 | Great Britain | 23—116 |

EARL C. THOMAS, Primary Examiner